United States Patent [19]

Copeland et al.

[11] 3,713,961
[45] Jan. 30, 1973

[54] DIELECTRIC WALL

[75] Inventors: Robert L. Copeland, Marion, Smyth County, Va.; Bobby G. Gamble, Rockland Acres, Hamblen County, Tenn.; Vance A. Chase; David R. Beeler, both of Poway, San Diego County, Calif.

[73] Assignee: Brunswick Corporation, Chicago, Ill. ; by said Copeland

[22] Filed: Oct. 6, 1969

[21] Appl. No.: 9,244

[52] U.S. Cl. ................161/93, 161/168, 161/192, 161/DIG. 5, 260/37 N
[51] Int. Cl. ........B32b 5/16, B32b 5/28, B32b 27/04
[58] Field of Search ............260/2.5 N, 37 N, 78 TF; 161/160, 158, 161, 168, 227, 93, 192

[56] References Cited

UNITED STATES PATENTS

| | | | |
|---|---|---|---|
| 2,806,509 | 9/1957 | Bozzacco et al | 161/161 |
| 3,249,561 | 5/1966 | Hendrix | 260/2.5 N |
| 3,310,506 | 3/1967 | Amborski et al. | 260/2.5 N |
| 3,345,342 | 10/1967 | Angelo | 161/227 |
| 3,371,009 | 2/1968 | Traynor, Jr. et al. | 260/37 N |
| 3,530,074 | 9/1970 | De Brunner | 161/227 |

*Primary Examiner*—William J. Van Balen
*Attorney*—Donald S. Olexa, Jerome M. Teplitz, John G. Heimovics and William G. Lawler

[57] ABSTRACT

A thermally set syntactic foam comprising a finally cured polyimide resin having a substantially uniform distribution of high dielectric particles therein. The above-identified syntactic foam is preferably utilized to form a dielectric wall in which the syntactic foam is a second layer and is secured to a first layer composed of a thermally set textile reinforced finally cured polyimide resin. It has been found that better results are obtained if the finally cured polyimide resin comprising the first layer has a void content of less than 5 percent.

6 Claims, 7 Drawing Figures

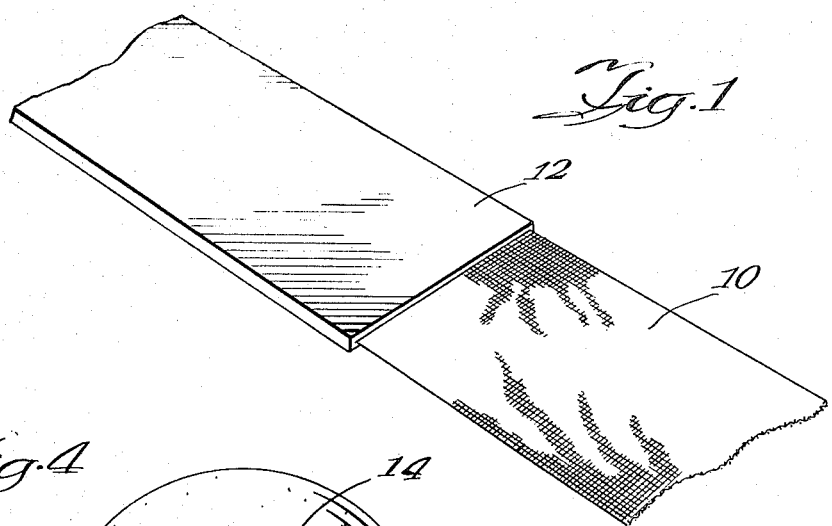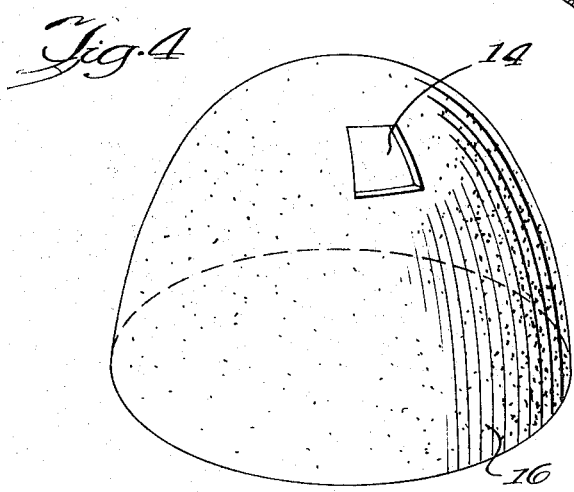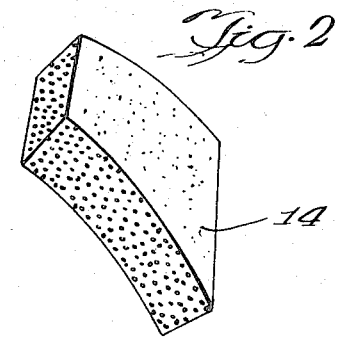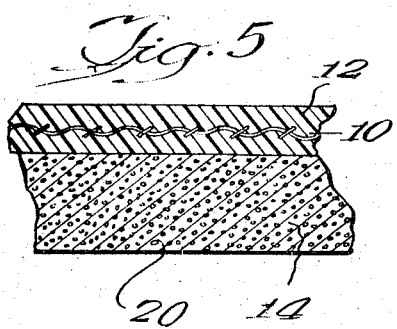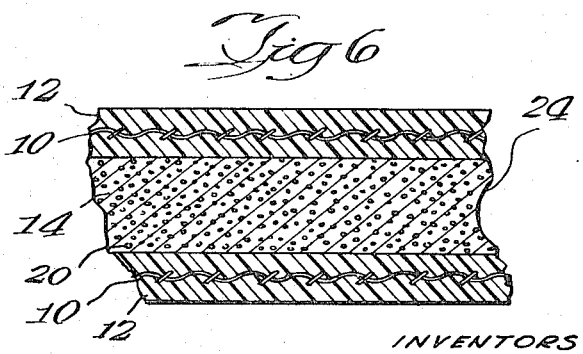

DIELECTRIC WALL

BACKGROUND OF THE INVENTION

Since the advent of supersonic aircraft there has been a great need for structurally dielectric walls such as those used as radomes which is not heretofore been met.

Generally speaking such aircraft necessitate having specific minimum properties; that is, high strength, e.g. a flexural strength of 80,000 psi, efficient electromagnetic radiation characteristics e.g. a loss tangent of less than 0.02, high heat resistance e.g. at least on the order of 250° F. and lightweightness e.g. approximately 130 pounds per cubic foot or less.

Radomes possessing certain of these properties have been made from reinforced polyesters and epoxies in both laminate and honeycomb-laminate structures, and have been found to be suitable for most applications but these have not been able to withstand temperatures in excess of 250° F. for any period of time. Since new high speed crafts such as the SST and space missiles require radomes that are capable of withstanding still higher temperatures on the order of 400° to 1,000° F. the industry has been unable to provide an acceptable product.

Moreover, these craft not only necessitate such heat resistant properties, but also necessitate a structure with improved strength characteristics. The heretofore usable epoxies and polyesters are unable to withstand such high temperatures and still provide good strength.

SUMMARY OF THE INVENTION

The present invention is directed to a syntactic polyimide foam which can be utilized with a cured polyimide resin having a void content of less than 5 percent to form a dielectric wall possessing the necessary properties whereby the composite structure can be utilized for radomes on supersonic aircraft.

The method of making the low void polyimide is set forth in a copending patent application and is not per se part of this invention. However, as noted supra, it is contemplated that the syntactic polyimide foam of this invention is to be utilized in conjunction with the said low void polyimide to produce a satisfactory radome structure.

The low void polyimide and the polyimide foam radome structure have the same strength characteristics as standard radome materials but, inter alia, have the advantage of being able to sustain these properties at temperatures above 500° F.

It is therefore the principal object of this invention to provide a polyimide composite comprising alternate layers of a low void reinforced laminated polyimide skin and intermediate core of finally cured polyimide resin having a substantially uniform distribution of high dielectric particles therein.

Still another object of the present invention is to disclose and provide a foamed polyimide structure having unformly disbursed therein hollow spheres substantially entirely coated with metal oxide flakes.

The above and other objects of the invention become more readily apparent by referring to the following description and accompanying drawings.

BRIEF DESCRIPTION OF THE DRAWINGS

FIG. 1 is a cut away view of a fabric coated with a low void polyimide resin;

FIG. 2 is a perspective view of a portion of the polyimide foam of this invention;

FIG. 4 is a perspective view of a radome-shaped dielectric wall;

FIG. 5 is a partial section of a dielectric wall;

FIG. 6 is a partial section of a sandwich dielectric wall; and

DESCRIPTION OF THE PREFERRED EMBODIMENT

Figure 3:
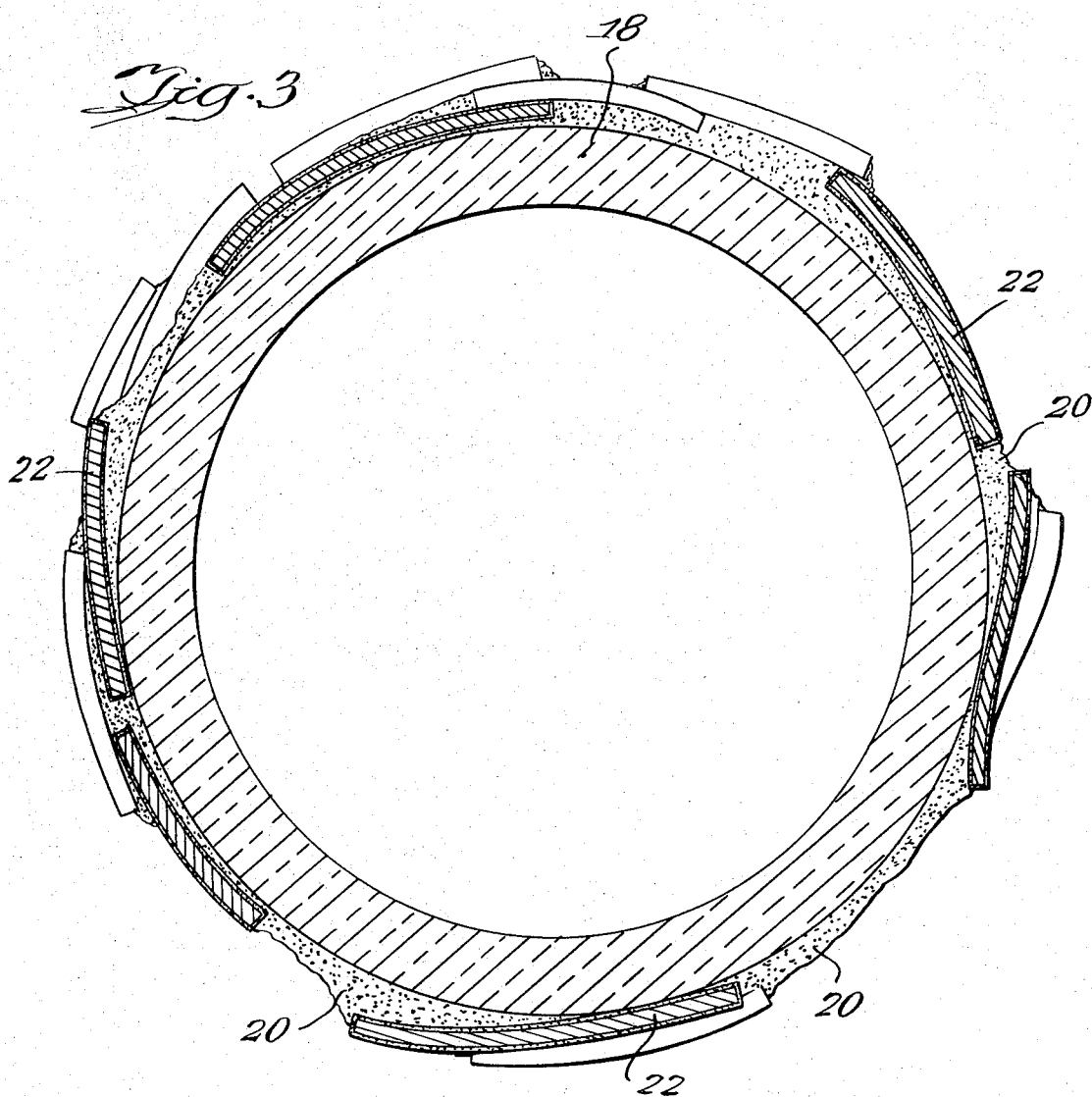
FIG. 3 is an enlarged cross-section of a hollow glass sphere coated with a resin and oxide coated metal flakes.
Figure 7:
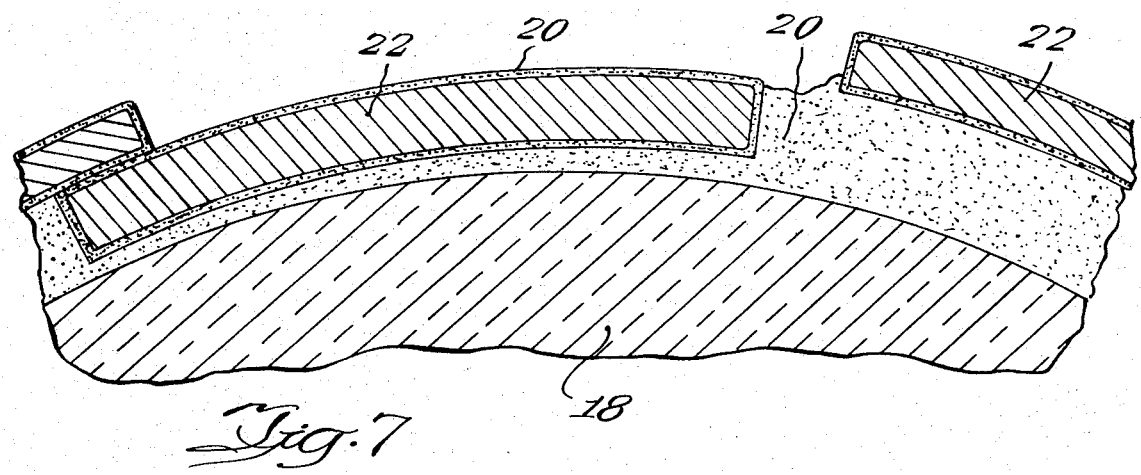
FIG. 7 is a partial section of the coated sphere.

As noted above, in any composite that is a reinforced laminate or laminate-foam used as a radome structure, it is necessary to have certain physical and electrical properties present to provide a structure which is acceptable for radome usage. Among these is the desire to provide a substantially uniform dielectric across the radome as well as the provision for a low loss tangent. It has been found that the low void polyimide composition of the invention whether a reinforced laminate or foam structure can provide the desired dielectric and loss tangent properties. Moreover and as will be discussed hereinafter, it has been found that these particular resulting polyimide resin products have superior characteristics when compared with standard plastic products heretofore used in producing radome structures.

A structure can be formed as a covering for an electromagnetic radiation source wherein the laminated skin is combined with the syntactic polyimide foam core wherein both the skin and the core are produced to have substantially the same dielectric values.

By way of further explanation and with specific reference to the drawing there is shown in FIG. 1 the material which can be used as the skin of the radome structure of the present invention in which a fabric reinforcement 10 has been impregnated with a polyimide polymer material 12 containing a void content under 5 percent.

As was explained supra, the method for making the low void polyimide resin is disclosed in a copending application entitled "Polyimide and Process Therefor" Ser. No 13,915, filed Oct. 6, 1969. The general method for making this polyimide foam, as set forth in the said copending application, is by starting with an aromatic dianhydride such as pyrolitic anhydride and an aliphatic or aromatic diamine which are dissolved in a suitable solvent such as N-methylpyrrolidone (NMP). A product illustrative of such a composition is sold under the trademark SKYBOND 703. Preferably this commercial product is mechanically mixed with thixotropic agent such as $SiO_2$ sold under the trade name CAB-O-SIL. This resin solution is then applied to a fabric. The fiber material is preferably made from materials such as glass fiber, but may also be asbestos, graphite, boron, metal or similar reinforcing materials or a combination of any of these materials. It is to be understood that as used herein the term reinforced layer includes one or more layers of fabric or other fiber systems impregnated with the resin material and initially processed. A laminate structure is defined to mean one or more such layers. The impregnated fabric is thereafter dried at room temperature for approximately 12 hours but in any case, long enough to insure the adequate solvent evaporation. At this stage the impregnated fabric is referred to as a prepreg. Thereafter the prepreg is heated in an oven and preferably for at least 1½ hours at the 250° F. Desirably the prepreg is heated in an air circulation oven. The actual temperatures and time conditions for heating the prepreg may vary over a range of anywhere from 70 hours at 150° F. to 1½ hours at 250° F. Subsequently these prepreg sheets are combined in a laminated composite of the desired thickness. The composite is then placed in a vacuum bag (such as that which is used in the industry) and the bag is thereafter evacuated over the range being from 21 to 29 inches of mercury. The then bagged composite is placed in an oven preferably in an air circulating autoclave which is pressurized, for a period of from three-quarters of an hour to 1 hour at a pressure ranging from 75 psig to 250 psig. While the oven is being pressurized, the temperature therein is raised to about 275° to 375° F. to control the imidization of the resin. The oven is held at heat for approximately 2 hours plus or minus 15 minutes. The bagged composite is cooled to a temperature of 150° F. with a minimum cooling time of one hour, there being no maximum cooling time. The bagged composite is removed from the oven and the vacuum bag stripped from the composite. The laminated composite is placed in an oven, preferably in an air circulating oven and the temperature is raised to about 350° F. in not less than ½ hour. It is preferable that the temperature rise take place over a 1 to 2 hour period. The temperature is then raised in the oven from about 50° to 100° F. every 24 hours. The time period can be longer or shorter depending upon the thickness thereof. These incremental temperature rises take place until the laminated composite has been held for at least 24 hours anywhere between 600° and 700° F. The composite is then cooled in the oven. The time for cooling is a function of the oven size however, the composite generally should not be cooled in less than 1 hour. Since ovens, heaters, air circulation autoclaves, etc., come in all sizes, the heating and cooling times can vary. Therefore, unless otherwise specified the times given can be extended any desired period.

In the reaction mechanism provided, prior to the first heating step (the 1½ hours at 250° F. to 70 hours at 150° F. range) substantially no imidization has taken place. During this first heating step it is believed that the mixed resin solution is substantially converted to an intermediate polyamic acid which is represented as:

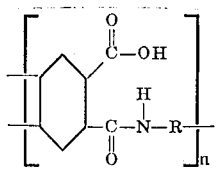

The next major phase of the processing occurs during the time that the vacuum bagged composite is heated under pressure to the 350° F. range, held there for a period of time and then slowly cooled. During this phase it is believed that the hydroxyl radical bonded to the carbon and the hydrogen bonded to the nitrogen combine to form water which is thereinafter released. It is also believed that concomitant therewith substantial imidization takes place and concurrently the resin goes through a glass transition stage (softening) permitting the hot $H_2O$ (probably in the form of steam) to be released by rising through the reinforced laminate composite with the vacuum assisting to remove the water vapor. The paths formed by the exiting water vapor are refilled by the softened resin material thereby closing the voids so that the composite is substantially void free. In addition it is also believed that ring closure takes place to form long molecular chains. The small amount $SiO_2$ is used as a flow control agent to maintain adherence of the resin solution to the fabric during the heating cycles.

Another method of making a reinforced low void polyimide is when a fabric such as fiber glass is impregnated with a polyamic acid. A resin solution of a diamine, a dianhydride and a solvent, such as NMP, 100 parts weight, and $SiO_2$ (such as CAB-O-SIL) 2 parts by weight are mechanically mixed together. The mixed resin solution is pre-reacted at temperatures of about 140° to 160° F. until a viscosity of approximately 75,000 to 100,000 centipoise (cps) is achieved. The viscous resin is diluted with a convenient solvent such as dimethylformamide to change the viscosity to approximately 27,000 cps to 33,000 cps while the viscous resin is still at the above elevated temperature. While remaining at approximately 140° to 160° F. a fabric such as fiber glass is impregnated with the dilute resin solution. The impregnated fabric is heated to approximately 240° to 260° F. and held until the desired volatile content is achieved. The time required to achieve the desired volatile content is from 17 minutes to 23 minutes. The resin impregnated fabric is now ready to be laminated into a reinforced composite, if desired, or further processed as is. From this stage on, the processing is similar to the first process described hereinabove for making a low void reinforced polyimide laminate composite. As in the process referred to hereinabove, there are variations contemplated which will be apparent to those skilled in the art.

As noted before, it is intended that the polyimide syntactic foam of this invention is to be utilized in conjunction with a low void polyimide described above.

The syntactic polyimide foam of this invention provides compatible characteristics of lightweight, high strength and high temperatures, uniform pre-selected dielectric and low loss tangents. As used in this description, the definition of syntactic foam can be found in *Glossary of Plastic Terms* published by the U. S. Department of Commerce/National Bureau of Standards/Institute for Applied Technology - AD-645 208.

A polyimide syntactic foam is made into shaped geometric sections as shown in FIG. 2 wherein a slab of foam is premolded to fit the final desired shape. Illustratively, the foam portion 14 is shaped to fit into a preselected shaped radome 16 shown in FIG. 4. However, the final shape of the foam portion can be any desired configuration.

The polyimide foam is made by mixing a mixed diluted pre-polymer resin solution (described hereinabove) with geometric bodies such as balls, spheres, balloons, etc., made from materials such as glass, ceramic, high temperature polymers, metals, alloys, etc. The choice of the proper material is dependent upon the design parameters and all materials listed above will afford a good loaded foam for specific end applications.

It has been found that the polyimide foam so produced provides a strong core structure for use in conjunction with one or more low void polyimide skins in applications such as radomes.

Illustratively, one example of the preferred embodiment is a loaded or syntactic polyimide foam used as a core with dielectric similar to the dielectric of the low void polyimide laminate skins.

Shown in FIG. 3 is one embodiment of a coated glass sphere used in making the syntactic polyimide foam. A hollow glass sphere 18 is first coated with a diluted mixed liquid resin solution 20. The liquid resin coated spheres 18 are mixed with a pre-selected quantity of aluminum oxide coated flakes in such a manner that substantially all of the spheres are completely covered by the flakes. However, if a lowering of the dielectric is desired, then an insufficient quantity of flakes is used so that not all the spheres are fully covered. During this process the aluminum oxide coated flakes are also covered by resin. The oxide and resin coatings on the flakes prevent the flakes from forming a conductive coating or film on the spheres.

By being able to disperse fine metal particles that are not conductive, one with the other, a syntactic foam with an acceptable loss tangent is produced.

By adjusting the quantity of flakes to the quantity of spheres and resin used, a dielectric is achievable that is similar to the low void polyimide skin.

It is fully contemplated with the scope of this invention that other metal flakes with oxide coatings thereon and other types of high dielectric coatable particles can be used and will be understood by those skilled in the art. Those skilled in the art can appreciate that by varying the ratios of the flakes to the spheres that the dielectric and loss tangent can be varied.

In order to achieve a dielectric that is similar to a low void reinforced laminate polyimide high dielectric particles such as hollow glass spheres or hollow ceramic spheres are combined with a pre-polymer solution of a diamine, a dianhydride in a solution with additional solvent added thereto. For example, the weight of the hollow glass spheres is about six times greater than the weight of the polymer solution and the extra solvents together. Particles other than hollow glass spheres may be used to vary the ratio of the weights. It is preferred that the hollow glass spheres have a diameter of about 20 microns to 80 microns.

Aluminum flakes with an oxide coating thereon are added to the resin coated spheres. The weight of the flakes range from one-twentieth to one-half the weight of the spheres. Preferably the flakes have a maximum dimension of 10 microns when the spheres have a diameter from 20 microns to 80 microns. However, the size and weight of the flakes can vary with the size of the spheres.

It is fully contemplated herein that other size spheres of glass or ceramic materials may be used. The pre-polymer solution, the solvent and the spheres are mixed together until the spheres are coated with the diluted resin solution. The time required to coat the spheres is dependent upon the amount to be mixed.

The flakes and the dilute resin coated spheres are mixed so that the flakes adhere to the surface of the spheres. During the mixing period the flakes also become coated with the dilute resin solution. Each metal based flake has an aluminum oxide film thereon, which in turn is covered by a thin resin coating. Accordingly, the resin coating of the flakes combined with the oxide film, also of the flakes, to prevent electrical current from passing from one flake to another and also to prevent an electrical current from passing around a partially coated flake surface of the sphere. The current referred to is substantially the same in magnitude as the current that could be passed through a piece of aluminum but is not of sufficient magnitude to be conducted through aluminum oxide or a polyimide resin.

The mixing time is dependent upon the quantity of material. An average mixing time to thoroughly coat the hollow glass spheres with resin and aluminum flakes is about 24 hours. The aluminum and resin coated spheres are dried in an oven at approximately 240° to 250° F. to remove the solvent. At least 12 hours should be allowed for this drying cycle and the mixture should be stirred every 5 to 15 minutes. The spheres are then screened retaining the spheres that pass through a −200 screen but are held by a 325 screen. It will be apparent to those skilled in the art that different size screens are used when starting with different size particles.

In order to make the syntactic polyimide foam about 87 parts by weight of the pre-polymer resin made from a diamine, a dianhydride, and a solvent is combined with approximately 100 parts by weight of the coated spheres described hereinabove. This ratio of solution to spheres yields a syntactic foam with a dielectric of about 3.2. By altering the ratio, different dielectrics can be provided, as desired. The pre-polymer resin solution and the spheres are thoroughly mixed together and packed in a pre-selected shaped mold such as illustrated in FIG. 2. The mold is vacuum bagged and then evacuated to between 21 and 29 inches of mercury. The bagged mold is heated to approximately 335° to 365° F. taking at least 2 hours to bring the mold up to this temperature. The time needed to reach the proper temperature can be extended any desired period of time over 2 hours. The bagged mold is held at a temperature of 335° to 350° F. for a period of between 45 minutes and 1¼ hours. The bagged mold is cooled to room temperature requiring at least 2 hours time for the cooling cycle. It is to be understood that the bagged mold should not be cooled in substantially less time than 2 hours; however, the cooling time can be extended if desired. The vacuum is released and the bag stripped from the mold. The part is removed from the mold and heated preferably in an air circulating oven where the temperature is increased from room temperature to about 350° to 365° F. A minimum period of time required for this heating operation is 1 hour. A longer period of time is fully contemplated to be within the scope of this invention. The temperature is then raised approximately 50° F. over a time period of at least 15 hours. The temperature is incrementally increased until a temperature of between 500° to 600° F. has been achieved and the part held at that temperature for at least 15 hours. The part is then removed from the oven.

As will be discussed hereinafter the molded section is combined with a low void reinforced laminate polyimide skin material in order to make a complete radome. This can be seen illustratively in FIGS. 2, 4, 5, and 6.

The following is one example of the process to produce a syntactic polyimide foam and is intended only to illustrate the invention and not to limit it in any way. As discussed above, in order to make a polyimide foam with a controllable dielectric it is first necessary to produce oxidized aluminum coatings on hollow glass spheres or other such desired material.

EXAMPLE I

I-A. The following components are composed of the following parts by weight and are placed into a mechanical tumbler and mixed:

1. Hollow glass spheres having a diameter of 20 to 80 microns     12
2. A pre-polymer solution of a diamine, a dianhydride and a solvent NMP     2
3. NMP solvent     2

I-B. The components were sealed in the tumbler and rotated for 2 hours.

I-C. The tumbler was opened and three-quarters part by weight of oxide coated aluminum flakes having a maximum dimension of approximately 10 microns were charged into the tumbler. The tumbler was resealed and contents thereof tumbled for 24 hours.

I-D. The aluminum covered resin coated spheres were removed from the tumbler and dried in an air-circulating oven for 25 hours to remove the solvent, stirring the spheres every 10 minutes.

I-E. The spheres were screened, with the acceptable product being those spheres that passed through a 200 screen that were held by a 325 screen.

I-F. By weight, 100 parts of coated spheres were mixed with 87 parts by weight of the resin solution comprising a diamine, a dianhydride, and a solvent, NMP.

I-G. After these parts were thoroughly mixed the material was packed in pre-selected shaped molds.

I-H. The mold was placed in a vacuum bag and evacuated to 26 inches of mercury.

I-I. The bagged mold was heated to 350° F. for 2¼ hours. The bagged mold was held an additional 1 hour at 350° F.

I-J. The bagged mold was cooled to 150° F. in the oven requiring 2¼ hours for cooling.

I-K. The bag was removed from the mold and the part was placed in an air-circulating oven wherein the temperature was raised gradually to 350° F. over a period of approximately 1¼ hours. The temperature was then raised 50° F. every 15 hours until a temperature of 550° F. was achieved with the mold being held at that temperature for 15 hours.

I-L. The syntactic polyimide foam was then cooled in the oven to 150° F. in 2 hours and removed from the oven thereafter.

The syntactic polyimide foam thus made exhibited a dielectric constant of 3.2, a loss tangent value of 0.015 and had a compressive strength of 1,000 psi.

Since these polyimides are such good heat resistant materials, the skin-core combination thereof provides characteristics hitherto unknown in dielectric walls because of their ability to withstand high temperatures, as previously mentioned. The low void reinforced laminated polyimide material, as a skin material, coupled with the polyimide syntactic foam as a core material provides a good combination for a substantially constant and uniform dielectric wall that will permit the efficient transmission of electromagnetic radiation therethrough, and provides a material combination usable as a radome which has a low loss tangent value. The range of dielectrics for the combination hereof is from 2 to 40 and the loss tangent value can range from 0.005 to 0.1.

Illustratively, a section of a part of a dielectric wall is shown in FIG. 5 wherein a syntactic polyimide foam 14 with oxide covered spheres 20 is bonded to a low void polyimide skin 12. However, another embodiment of the invention is a sandwich dielectric wall construction used for radomes as shown in FIG. 6. The sandwich 24 has two skin layers 12 separated by a core 14. Those skilled in the art will easily recognize that as the number of cores 14 and skins 12 are increased, and where there is always one more layer of skin 12 than core 14, then the broad band characteristics of a radome structure can become wider and broader as the number of layers increases because it is possible to vary the dielectrics and yet provide low loss tangent values.

The low void reinforced polyimide composite and the polyimide foam can be very advantageously used together to form a radome from a manufacturing viewpoint. A prepreg reinforced laminated skin material is wrapped about a mold such as the skin 12 of the sandwich 24 in FIG. 4. The skin undergoes all the remaining processing stages to provide a processed low void polyimide skin shaped to the mold. The skin is coated with an adhesive and the polyimide foam placed over the adhesive for bonding to the skin. The polyimide foam can be in a state where it has undergone Step I—I of EXAMPLE I as described hereinabove, or at any state of processing beyond Step I—I. The syntactic foam is subjected to the remaining cycle of processing to produce a postcured polyimide foam. During the processing the adhesive is cured, bonding the first skin layer and the polyimide foam. Next, a second skin in the form of a prepreg is wrapped over the skin-core composite after an adhesive coating has been placed on the exposed core surface. The composite structure is processed to produce a postcured state in the second skin layer as well as bonding it to the core. It is fully contemplated that the layers may be assembled on the mold support substantially during any stage to which they have been processed. The skin-core layer arrangement may be provided wherein each layer is postcured prior to being assembled. Accordingly, the mating surfaces will be covered with adhesive requiring a process only of sufficient nature to cure the adhesive and bond the skin-core-skin together.

It is also contemplated that all layers may be mounted each in the most minimum of processed states all at the same time. This means that prepreg laminates with a core that has not undergone any heating can be plyed and processed. Special mold dies will be needed in order to produce the proper external pressure from the die and at the same time provide a means to pull a vacuum on each part. This will be readily understood by those skilled in the art of designing special die molds.

The layers may be processed all together or they may be processed in any arrangement, as desired. Because polyimide is a thermosetting plastic, the reaction will not reverse; once a part is fully processed, any further processing of subsequent parts has no effect thereon.

Although many specific embodiments of the invention and processes therefore have been described, many modifications and changes may be made therein without departing from the scope of the invention as defined in the apended claims.

We claim:

1. A thermally set syntactic foam comprising a finally cured polyimide resin having a substantially uniform distribution of high dielectric coated siliceous spheres therein; said spheres being coated with metal flakes, each of said flakes having a metallic oxide surface thereon and said flakes being substantially electrically isolated from each other.

2. The foam of claim 1 wherein said flakes are aluminum.

3. A composite product comprising:
   a first layer of thermally set textile reinforced finally cured polyimide resin having a void content of less than 5 percent;
   a second layer of thermally set syntactic foam comprising a finally cured polyimide resin having a substantially uniform distribution of high dielectric coated siliceous spheres therein; said spheres being coated with metal flakes each of said flakes having a metallic oxide surface thereon and said flakes being substantially electrically isolated from each other; and
   means securing said first layer to said second layer.

4. The product of claim 3 wherein said layers have substantially similar dielectric properties.

5. The product of claim 3 wherein said securing means comprises an adhesive bonding agent.

6. The product of claim 3 wherein said spheres have a size range of about 20 microns to 80 microns.

* * * * *